United States Patent
Katoh et al.

(10) Patent No.: US 7,072,005 B2
(45) Date of Patent: Jul. 4, 2006

(54) IPS LCD AND REPAIR METHOD OF CUTTING DEFECTIVE PIXEL ELECTRODE BY FORMING WINDOW IN CAPACITOR STORAGE CIRCUIT

(75) Inventors: Masataka Katoh, Shiga (JP); Wakatsuki Toru, Shiga (JP)

(73) Assignee: Chi Mei Optoelectronics Corp. (TW)

( * ) Notice: Subject to any disclaimer, the term of this patent is extended or adjusted under 35 U.S.C. 154(b) by 18 days.

(21) Appl. No.: 10/636,159

(22) Filed: Aug. 6, 2003

(65) Prior Publication Data
US 2004/0141132 A1  Jul. 22, 2004

(30) Foreign Application Priority Data
Aug. 21, 2002  (JP)  ............................. 2002-241117

(51) Int. Cl.
*G02F 1/13* (2006.01)
(52) U.S. Cl. ..................... 349/55; 349/141; 349/38; 349/39; 349/192
(58) Field of Classification Search ................ 349/141, 349/142, 192, 38–39, 55
See application file for complete search history.

(56) References Cited

U.S. PATENT DOCUMENTS

| 6,778,233 B1 * | 8/2004 | Matsuura et al. ............. 349/54 |
| 2002/0154079 A1 * | 10/2002 | Shiota et al. ................. 345/87 |
| 2003/0025846 A1 * | 2/2003 | Murakami et al. ............ 349/39 |

FOREIGN PATENT DOCUMENTS

JP   11-119253   4/1999

\* cited by examiner

*Primary Examiner*—Andrew Schechter
*Assistant Examiner*—Phu Vu
(74) *Attorney, Agent, or Firm*—Milde & Hoffberg, LLP

(57) ABSTRACT

The disclosure concerns an IPS LCD having a structure for changing a bright pixel to a dark pixel and a method of changing a bright pixel to a dark pixel. In the method of changing a bright pixel to a dark pixel, a pixel electrode 16 is cut at the end of an aperture 14. In the IPS LCD structure, a cut 32 is formed in a CS circuit 18 of a pixel region 12 and a laser beam is applied to the pixel electrode 16 throughout the cut 32 from a substrate side to cut the pixel electrode 16. Instead of the cut 32, a window 34 may be formed to apply a laser beam therethrough.

5 Claims, 7 Drawing Sheets

IPS LCD AND REPAIR METHOD OF CUTTING DEFECTIVE PIXEL ELECTRODE BY FORMING WINDOW IN CAPACITOR STORAGE CIRCUIT

BACKGROUND OF THE INVENTION

1. Field of the Invention

The present invention relates to an in-plane switching (IPS) liquid crystal display (LCD) having a structure for changing a bright pixel to a dark pixel and a method of changing a bright pixel to a dark pixel.

2. Description of Related Art

An LCD is used in various types of electronic equipment such as a personal computer and a cellular phone. Among various LCDs, an IPS LCD is used as a wide viewing angle LCD.

As shown in FIG. 1(a), an IPS LCD 40 comprises a pixel region 12, an aperture 14 formed in the pixel region in which liquid crystal and strip-like pixel electrodes 16 are provided, a CS (capacitor storage) circuit 18 adjacent to the aperture 14, and a pad 20 disposed in opposition to the CS circuit 18 and connected to the pixel electrodes 16. A CS line in a pixel region 12 is referred to as the "CS circuit". A storage capacity is thus formed by the pad and CS circuit. A TFT (thin film transistor) 24 is used as a switching element for connecting the signal line 26 and the pad 20. A gate line 22 of the TFT 24 is provided in parallel with the CS line. The pixel regions 12 are arranged in rows and columns on a substrate. To the aperture 14, common electrodes 28 are provided in parallel with the pixel electrodes 16. A potential of the common electrode 28 is the earth potential. Arbitrary numbers of the pixel electrodes 16 and the common electrodes 28 can be used, since electric fields are generated between the pixel electrodes 16 and the common electrodes 28.

In the IPS LCD 40, an electric field 44 is generated between the pixel electrode 16 and the common electrode 28 by applying a voltage to the pixel electrode 16, as shown in FIG. 1(b). A display is created by controlling the orientation of liquid crystal molecules 42 by this electric field 44. In this specification, the IPS LCD 40 is a normally black display. Therefore, the pixel 12 is dark when no voltage is applied to the pixel electrode 16, whereas it is bright when voltage is applied thereto.

In the IPS LCD 40, a short circuit between the signal line 26 and the pixel electrode 16, a short circuit between a drain electrode and a source electrode of the TFT 24, or a short circuit between a gate electrode and a drain electrode of the TFT 24 causes a bright pixel defect. Such bright pixel has higher intensity than a normal pixel when the LCD is on or off and significantly degrades the display quality of the LCD.

In order to solve the above problem, a method of changing a bright pixel to a dark pixel has been conventionally employed so as to obscure the bright pixel defect. In this method, the pad 20 and the CS circuit 18 are short-circuited by the application of laser beam so as to equalize the potentials of the electrodes 16 and the CS circuit 18. In this specification, the dark pixel means a black pixel regardless of whether the LCD is on or off.

However, in order to short-circuit members consisting mainly of aluminum, high-energy laser beam must be applied. This may cause the meltdown of the aluminum members, heat transfer to the liquid crystal, and the generation of bubbles in and around the aperture 14.

Further, Japanese Unexamined Patent Publication No. (Patent Kokai No.) 11-119253 (1999) discloses a transformed gate line and a method of cutting a gate line of a bright pixel by laser. However, since aluminum or tantalum is used as a gate line, the cutting of the gate line may exert an adverse effect on surrounding pixels as described above.

Accordingly, an object of the present invention is to provide an IPS LCD having a structure for changing a bright pixel to a dark pixel and a method of changing a bright pixel to a dark pixel.

SUMMARY OF THE INVENTION

An IPS LCD of the present invention comprises: a substrate having a plurality of pixel regions in rows and columns, an aperture formed on the substrate in each pixel region and having liquid crystal and one or more strip-like pixel electrodes therein; a CS circuit disposed on the substrate adjacent to the aperture and having a cut formed in a side thereof which is adjacent to the aperture; and a pad disposed in opposition to the CS circuit and connected to the strip-like electrodes. Since a strip-like electrode is cut inside the cut in the CS circuit, no electric field will be applied to the liquid crystal in the aperture at all. Thus, a bright pixel can be changed to a dark pixel.

The aforementioned cut is so formed that laser beam can be applied to the strip-like electrode.

Further, instead of the cut in the CS circuit, a window may be formed in a part of the CS circuit that corresponds to the location of the strip-like electrode.

In a method of changing a bright pixel to a dark pixel in an LCD comprising a substrate having a plurality of pixel regions arranged in a row and columns; an aperture formed in each pixel region and having liquid crystal and one or more strip-like pixel electrodes therein; a CS circuit adjacent to the aperture; and a pad opposed to the CS circuit and connected to the strip-like electrodes according to the present invention, a strip-like electrode of only a bright pixel region among the plurality of pixel regions is cut at the end of the aperture.

Further, a method of changing a bright pixel to a dark pixel in an LCD comprising a substrate, having a plurality of pixel regions arranged in rows and columns; an aperture formed in each pixel region and having liquid crystal and one or more strip-like pixel electrodes therein; a CS circuit adjacent to the aperture; and a pad opposed to the CS circuit and connected to the strip-like electrodes comprises the steps of: forming a cut in a side of the CS circuit to which the aperture is adjacent; and applying laser beam to the strip-like electrode of only a bright pixel region among the plurality of pixel regions through the cut so as to cut the strip-like electrode.

The step of forming a cut may be the step of forming a window in a part of the CS circuit that corresponds to the location of the pixel electrode. Through this window, laser beam is applied to the strip-like electrode so as to cut the electrode. Such cut or window is formed at the same time the CS circuit is formed.

In the present invention, a cut or window is formed in a CS circuit, so that laser beam can be applied to an electrode through the cut or window from a substrate side. Further, since the CS circuit is covered with a black matrix, no adverse effects are exerted on a display quality of the LCD. Unlike in a conventional invention, aluminum members are not short-circuited in the present invention, so that the output of the laser can be reduced. Furthermore, when aluminum members are short-circuited in a conventional invention, bubbles are generated in surrounding pixels due to heat. However, such adverse effects are not produced in the present invention.

Further, even in a conventional IPS LCD, a bright pixel can be easily changed to a dark pixel by cutting an electrode at the end of an aperture.

DESCRIPTION OF THE PREFERRED EMBODIMENTS

Embodiments of an IPS LCD and a method of changing a bright pixel to a dark pixel according to the present invention will be described with reference to the accompanying drawings. First, a method of changing a bright pixel to a dark pixel in a conventional IPS LCD will be described.

Figure 1:
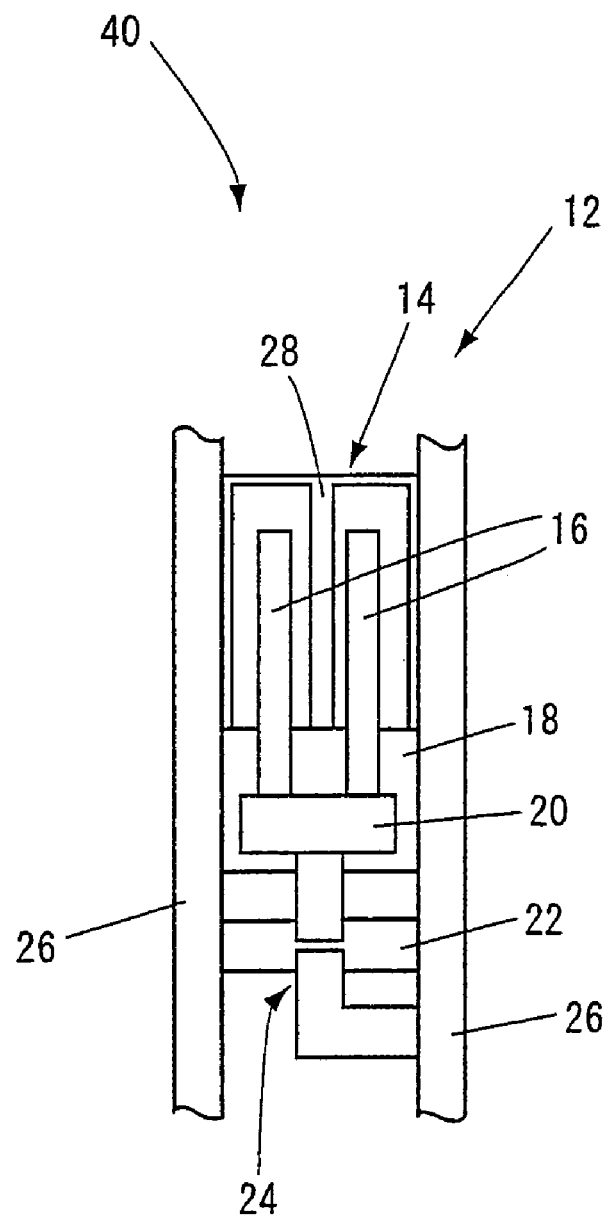
FIG. 1(a) shows a pixel region of a conventional IPS LCD.
FIG. 1(b) shows a relationship between electrodes and liquid crystal molecules.
FIG. 1(c) shows multiple pIxel regions of an IPS LCD.
Figure 1:
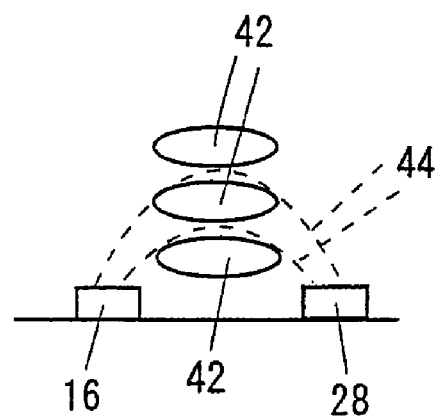
Figure 1C:
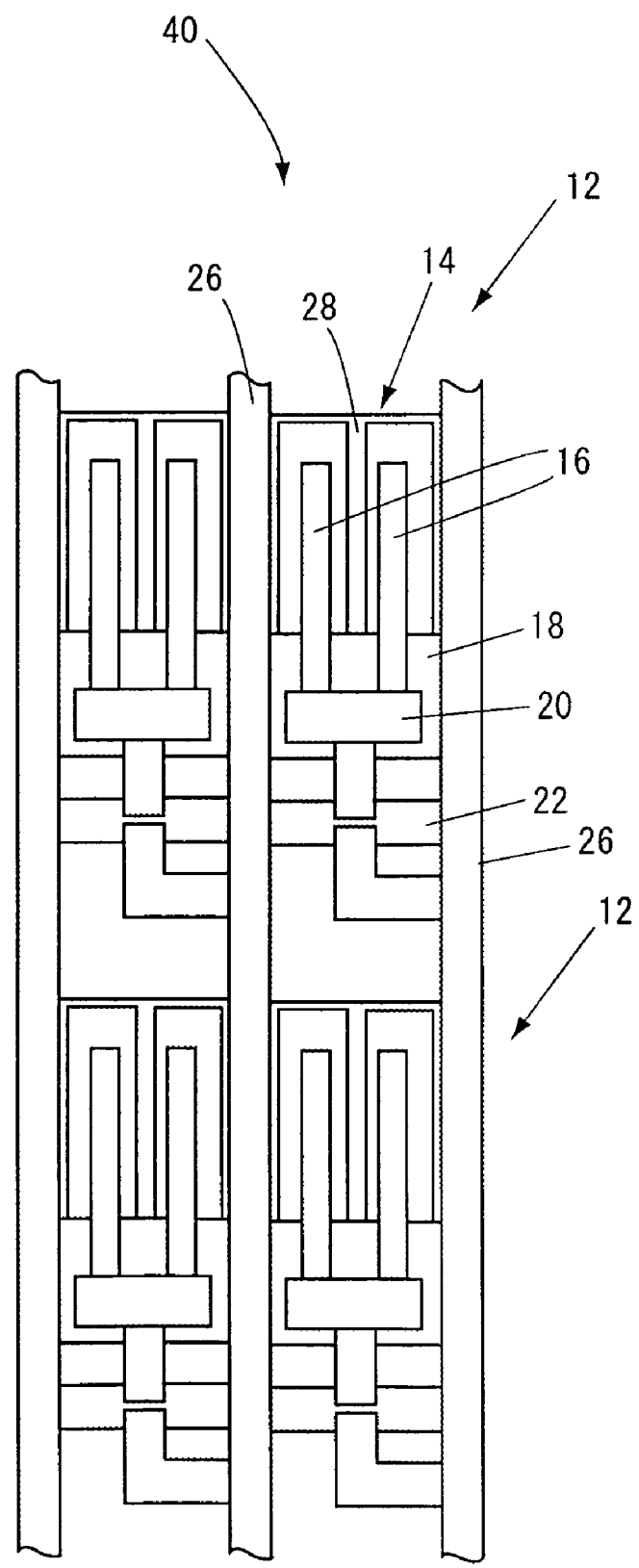
Figures 2A, 2B:
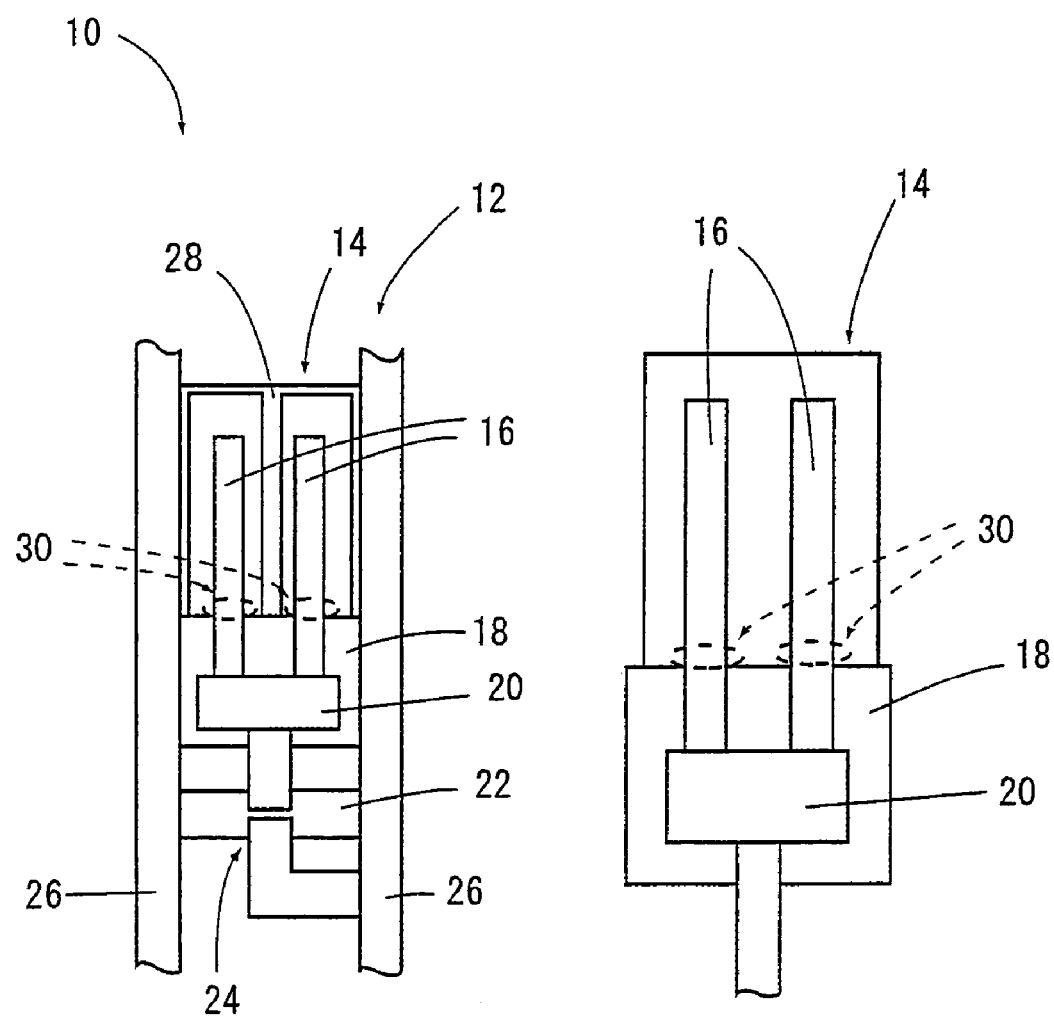
FIG. 2(a) shows a part to be cut in a pixel of an IPS LCD according to the present invention and FIG. 2(b) is an enlarged view of the part to be cut.

As shown in FIG. 2(a), an IPS LCD 10 comprises a pixel 12, an aperture 14 formed in the pixel 12 in which liquid crystal and strip-like pixel electrodes 16 are provided, a CS circuit 18 adjacent to the aperture 14, and a pad 20 opposed to the CS circuit 18 and connected to the pixel electrodes 16. A CS line in a pixel 12 is referred to as a CS circuit. A TFT (thin film transistor) 24 is used as a switching element for connecting the signal line 26 and the pad 20. A gate line 22 of the TFT 24 is provided in parallel with the CS line. The pixels 12 are arranged in rows and columns on a substrate. The CS circuit 18 and the pad 20 form a storage capacitor. Common electrodes 28 are provided in parallel with the pixel electrodes 16. Arbitrary numbers of the pixel electrodes 16 and the common electrodes 28 can be used, as far as electric fields are generated between the pixel electrodes 16 and the common electrodes 28.

In this IPS LCD 10, the pixel 12 is a bright pixel, so that it is changed to a dark pixel. As shown in FIG. 2(b), the pixel electrodes 16 are cut at the end of the aperture 14. In other words, the pixel electrodes 16 are cut at the boundary or near the boundary between the aperture 14 and the CS circuit inside the aperture 14. In FIG. 2(b), an ellipse 30 shown by dashed lines indicates a part to be cut. In FIG. 2(b), the common electrodes 28 are not shown.

The pixel electrode 16 is cut by laser beam. The pixel electrode 16 is a transparent conductive film such as ITO (indium tin oxide). Therefore, unlike in the conventional method in which aluminum members are short-circuited, the pixel electrode 16 can be cut by lower-energy laser beam.

After the pixel electrode 16 is cut, even if the TFT is turned on, no voltage is applied to the pixel electrode 16 and therefore the pixel 12 remains in black. In this way, the bright pixel is changed to a dark pixel, so that the bright pixel defect becomes obscure.

Figure 3:
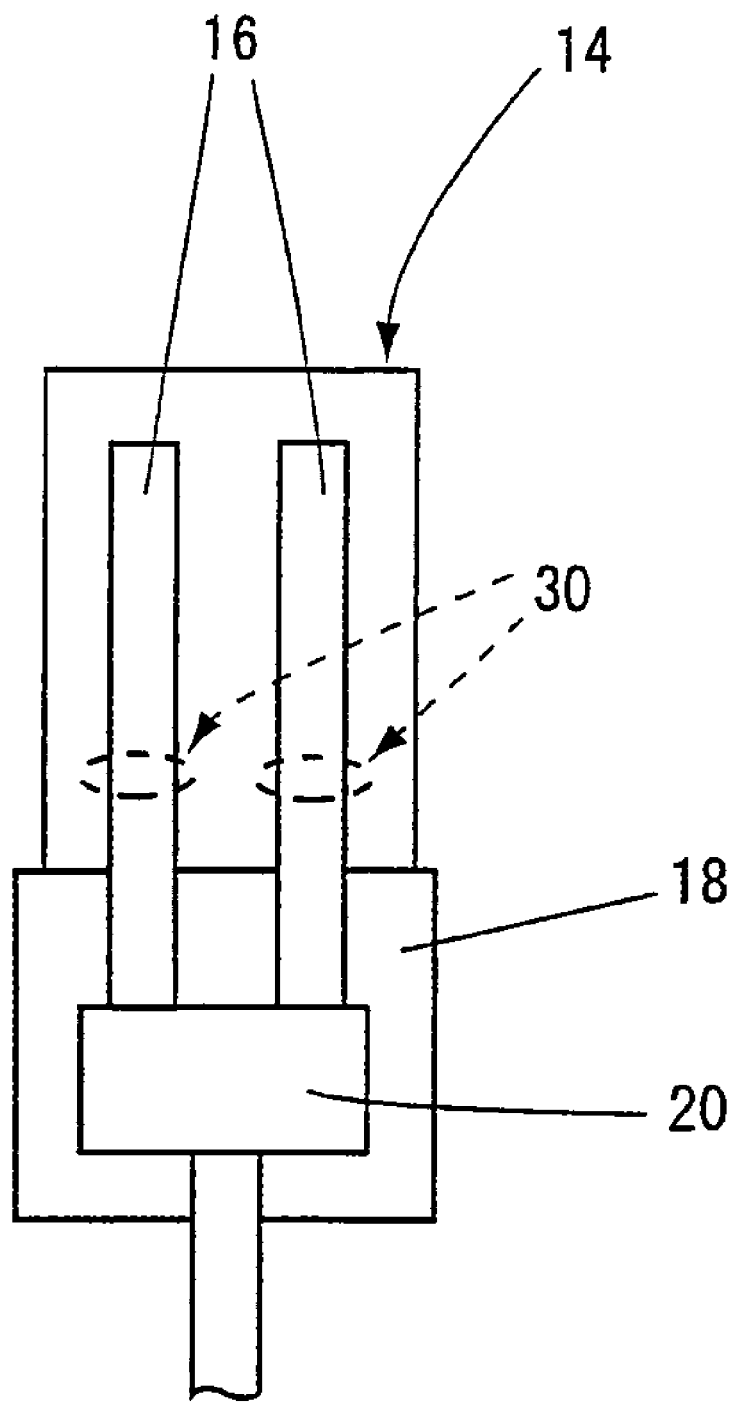
FIG. 3 shows an inappropriate part to be cut in the pixel of the IPS LCD shown in FIG. 2(b).

As described above, the defect of the pixel 12 can be obscured using the method of the present invention. However, it is noted that the pixel electrode 16 must be cut at the end of the aperture 14. If the pixel electrode 16 is cut at the middle of the aperture 14 as shown in FIG. 3, an electric field is generated because voltage is applied to a part of the pixel electrode 16 that is stuck out of the CS circuit 18. At the result, the orientation of liquid crystal molecules is changed, and therefore the bright pixel is not changed to a dark pixel.

Figure 4A:
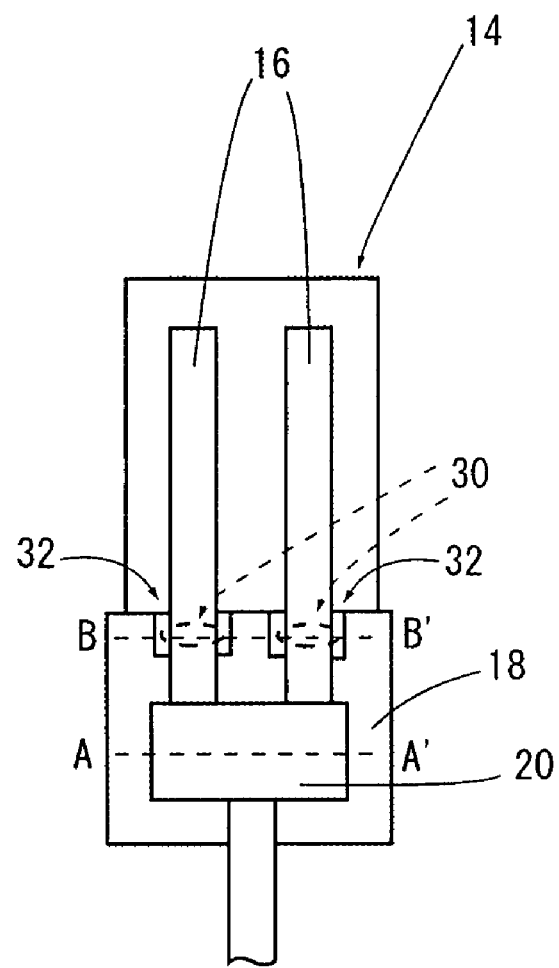
FIG. 4(a) shows a Cs circuit in a pixel of the LCD according to the present invention.
Figure 4B:
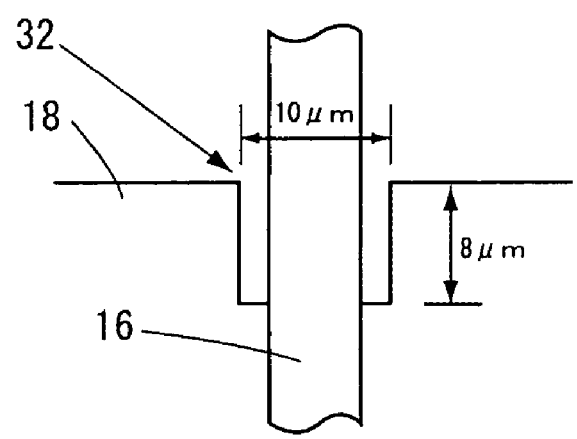
FIG. 4(b) shows an enlarged view of the CS circuit.
Figure 4C:
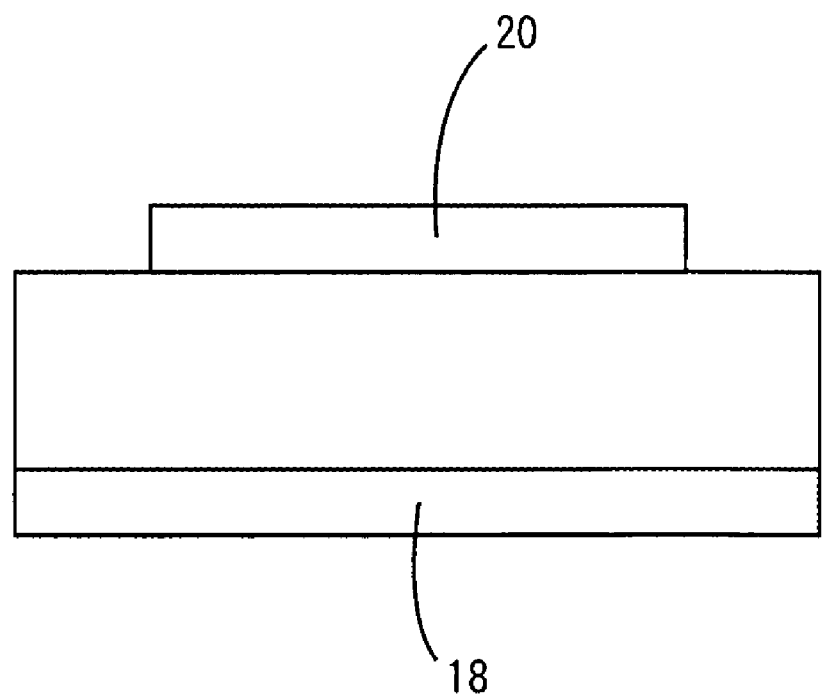
FIG. 4(c) is an enlarged cross-sectional view taken along the line A–A' of FIG. 4(a) and FIG. 4(d) is an enlarged cross-sectional view taken along the line B–B' of FIG. 4(a).
Figure 4D:
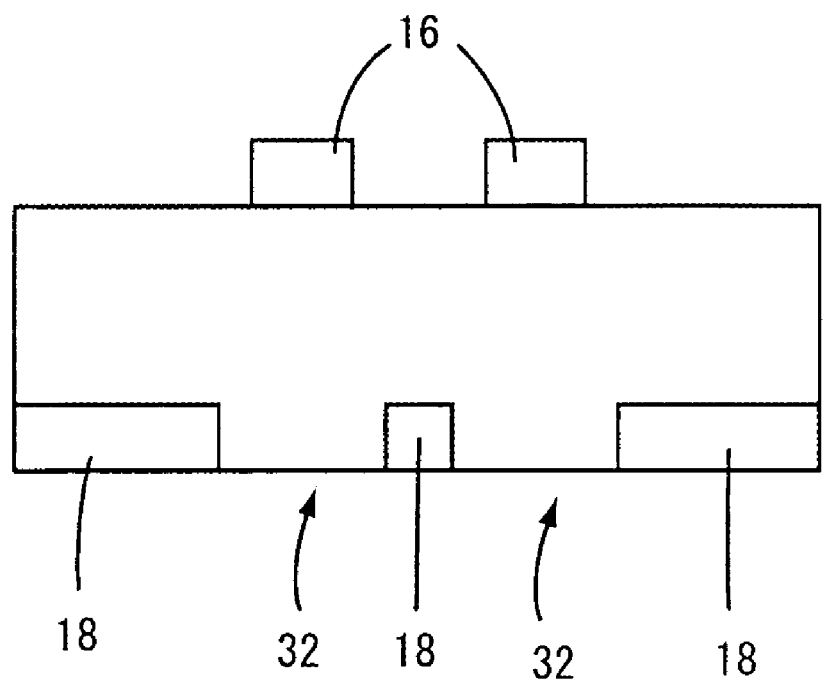

In order to solve this problem, an IPS LCD having a structure for changing a bright pixel to a dark pixel without fail and a method of changing a bright pixel to a dark pixel without fail will be described below. As shown in FIGS. 4(a) and 4(b), cuts 32 are formed in a side of the CS circuit 18 to which the aperture 14 is adjacent in this IPS LCD. In FIGS. 4(a) and 4(b), common electrodes are not shown.

The cut 32 is so formed that laser beam can be applied to the pixel electrode 16 therethrough. A part of the pixel electrode 16 that is projected onto the cut 32 when the pixel electrode 16 is projected onto the CS circuit 18 is cut by laser beam. The cut 32 can be of any shape. It may be square, rectangular, semicircular, semi-elliptical in shape. The cut 32 is wider than the pixel electrode 16. For example, if the cut 32 is rectangular in shape, the size of the cut 32 may be 10 µm in width and 8 µm in length, as shown in FIG. 4(b). The cut 32 is formed at the same time the CS 18 circuit is formed.

Laser beam is applied only to a pixel electrode 16 of a bright pixel through a cut 32 from a substrate side. Although a cut 32 is formed in all the CS circuits 18 of the pixels 12, it does not cause the degradation of display quality because the cut 32 is covered with a black matrix of a color filter of the LCD. Further, since the pixel electrode 16 is not cut in the aperture 14, a bright pixel can be changed to a dark pixel without fail.

Thus, a bright pixel can be changed to a dark pixel in the IPS LCD. Unlike in a conventional method in which aluminum members are short-circuited by the application of laser beam, lower-energy laser is required in the method of the present invention. Further, unlike in the conventional method, no adverse effects are exerted on surrounding pixels 12 in the method of the present invention when a bright pixel is changed to a dark pixel.

Figure 5A:
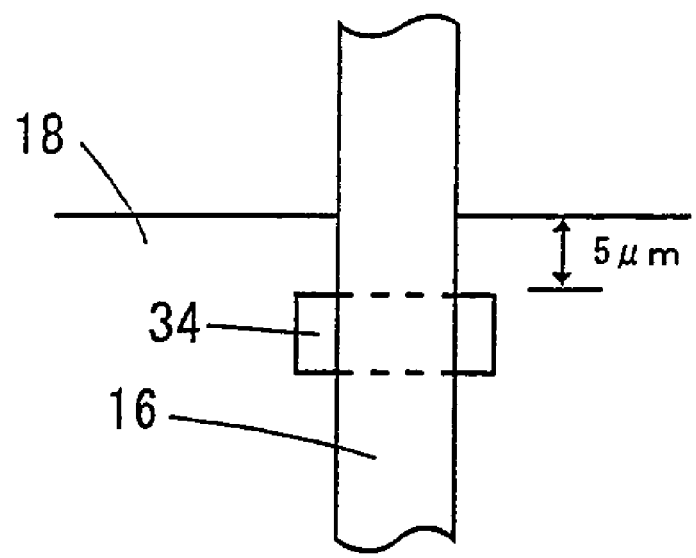
FIG. 5(a) shows a rectangular window that is provided instead of a cut and FIG. 5(b) shows an elliptic window.

While the embodiments of the present invention have thus been described with reference to the drawings, it should be understood that the present invention be not limited to the aforementioned embodiments. For example, a window may be formed instead of a cut. As shown in FIG. 5(a), a window 34 is formed in the CS circuit 18. The window 34 is formed in a part of the CS circuit that corresponds to the location of the pixel electrode 16. In other words, the window 34 is so formed that laser beam can be applied to the pixel electrode 16 wherethrough from a substrate side. For example, the window 34 is formed in the position that is 5 µm away from a border between the CS circuit 18 and the aperture 14. The pixel electrode 16 can be cut by applying laser beam thereto from a substrate side through the window 34 formed in the CS circuit.

Figure 5B:
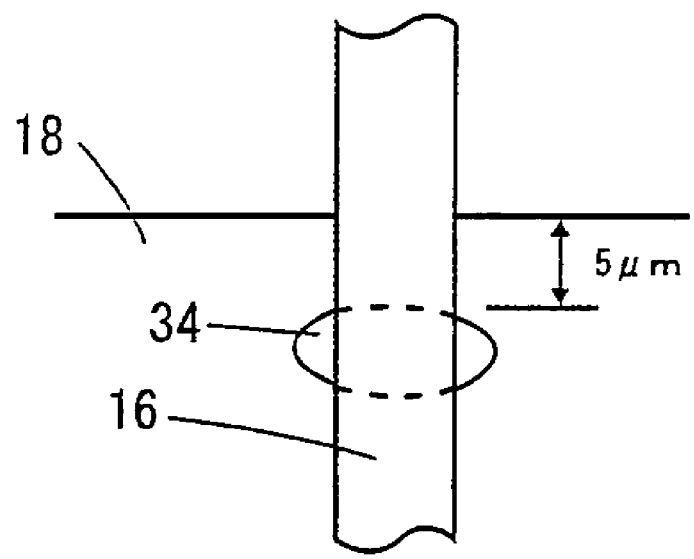

As shown in FIG. 5(b), the window 34 may be elliptical in shape. If the window 34 is rectangular in shape as shown in FIG. 5(a), the size of the window 34 may be 10 µm in width and 5 µm in length. If the window 34 is elliptical in shape, the size of the window 34 is 10 µm in major axis and 5 µm in minor axis. The window 34 can be of any size, as far as laser beam can be applied through the window 34 so as to cut the pixel electrode 16. In other words, the window 34 is wider than the pixel electrode 16.

The LCD 10 is a normally-black LCD. Therefore, the LCD 10 must have a strip-like pixel electrode 16 therein.

There has thus been shown and described a novel IPS LCD and a novel method of changing a bright pixel to a black pixel which fulfill all the objects and advantages sought therefor. Many changes, modifications, variations and other uses and applications of the subject invention will, however, become apparent to those skilled in the art after considering this specification and the accompanying drawings which disclose the preferred embodiments thereof All such changes, modifications, variations and other uses and applications which do not depart from the spirit and scope of the invention are deemed to be covered by the invention, which is to be limited only by the claims which follow.

What is claimed is:

1. An in-plane switching (IPS)_liquid crystal display (LCD) comprising:
    a substrate with pixel regions thereon arranged in rows and columns;
    an aperture formed in each pixel region of the substrate and having liquid crystal and at least one strip-like pixel electrode therein;
    a capacitor storage (CS) circuit disposed in overlapping relationship to the strip-like electrode in each pixel region adjacent to the aperture; and
    a pad disposed in opposition to each CS circuit and connected to the strip-like electrode,
    wherein a cut is formed in a side of the CS circuit to which the aperture is adjacent and that corresponds to the location and exceeds the width of the strip-like electrode.

2. The IPS LCD according to claim 1, wherein said cut is formed in a position through which a laser beam may be applied to the strip-like electrode.

3. An in-plane switching (IPS) liquid crystal display (LCD) comprising:
    a substrate with pixel regions thereon arranged in rows and columns;
    an aperture formed in each pixel region of the substrate and having liquid crystal and at least one strip-like pixel electrode therein;
    a capacitor storage (CS) circuit disposed in overlapping relationship to the strip-like electrode in each pixel region adjacent to the aperture; and
    a pad disposed in opposition to each CS circuit and connected to the strip-like electrode,
    wherein a window is formed in a part of the CS circuit in each pixel region adjacent the aperture that corresponds to the location and exceeds the width of the strip-like electrode.

4. A method of changing a bright pixel to a dark pixel in an in-plane switching (IPS) liquid crystal display (LCD) comprising a substrate with pixel regions thereon arranged in rows and columns; an aperture formed in each pixel region of the substrate and having liquid crystal and at least one strip-like electrode therein; a CS circuit disposed in overlapping relationship to the strip-like electrode in each pixel region adjacent to the aperture; and a pad disposed in opposition to each CS circuit and connected to the strip-like electrodes; said method comprising the steps of:
    providing a cut in a side of the CS circuit in each pixel region to which the aperture is adjacent and that corresponds to the location and exceeds the width of the strip-like electrode; and
    applying a laser beam to the strip-like electrode of only a continuously bright pixel region among the plurality of pixel regions through the cut so as to cut the strip-like electrode, thereby to change the bright pixel to a dark pixel.

5. A method of changing a bright pixel to a dark pixel in an in-plane switching (IPS) liquid crystal display (LCD) comprising a substrate with pixel regions thereon arranged in rows and columns; an aperture formed in each pixel region of the substrate and having liquid crystal and at least one strip-like electrode therein; a CS circuit disposed in each pixel region adjacent to the aperture; and a pad disposed in opposition to each CS circuit and connected to the strip-like electrodes; said method comprising the steps of:
    providing a window in a part of the CS circuit in each pixel region adjacent the aperture that corresponds to the location and exceeds the width of the strip-like electrode; and
    applying a laser beam to the strip-like electrode of only a continuously bright pixel region among the plurality of pixel regions through the window so as to cut the strip-like electrode, thereby to change the bright pixel to a dark pixel.

* * * * *